United States Patent Office 2,704,689
Patented Mar. 22, 1955

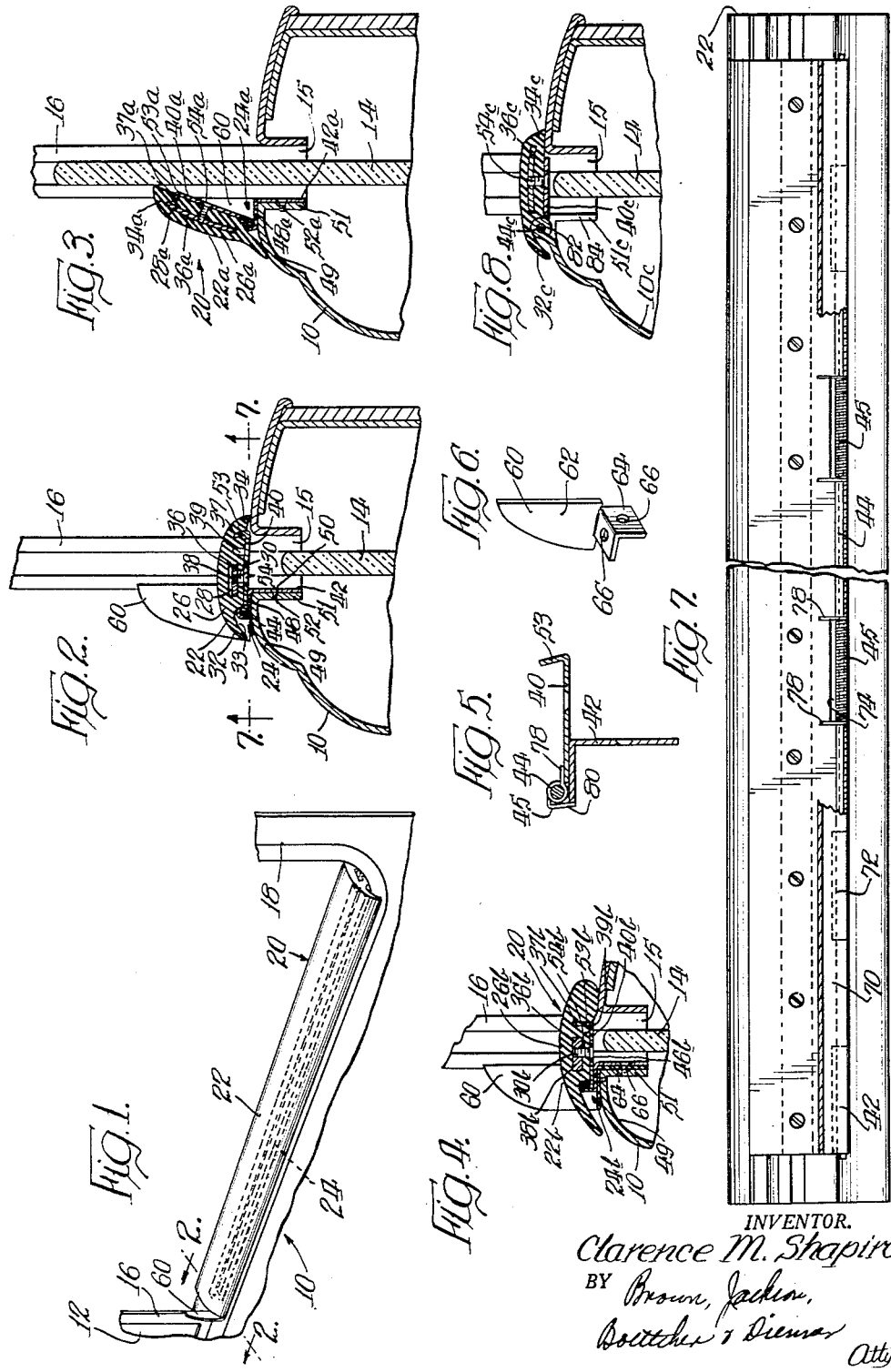

2,704,689

WEATHER STRIP STRUCTURE FOR AUTOMOBILE DOOR WINDOWS OR THE LIKE

Clarence M. Shapiro, Chicago, Ill.

Application April 19, 1951, Serial No. 221,907

13 Claims. (Cl. 296—49.2)

The present invention relates to weather stripping for vehicle door windows and is an improvement on the weather stripping of my copending applications, Serial No. 172,740, filed July 8, 1950, and Serial No. 206,647, filed January 18, 1951, now Patent No. 2,633,380.

Most automobile and truck doors have window glass which may be raised and lowered through a slot disposed in the lower part of the window frame portion of the door, the window glass when completely lowered lying inside of the door and generally having its top edge lying below, or flush with, the top of the slot or window well, and, when completely raised, generally having its side edges and top edge disposed within a groove which extends up the sides and across the top part of the window frame portion. Even when the window glass is held by its lower edge in a supporting structure, which will, when the window glass is completely raised, partially fill the slot or well to close it off to water, snow, dirt, etc., some water and dirt can get inside the door. This is especially true when the automobile is being washed. However, when the window is lowered, either partially or completely, rain, snow, dirt, and the like can get inside the door between the glass and frame very easily, with the result that the door may rust from the inside and the operating mechanism for the window glass and door latch may rust or become damaged by water and dirt working into it. As evidence of the fact that water does get inside the doors, it will be noted that most doors have drain holes provided at the bottom to discharge such water.

In my prior applications, I have disclosed weather stripping pivotally mounted on the vehicle door adjacent the lower edge of the vertically reciprocable window. A resilient weather strip intimately engages the window when the window is elevated to provide a seal to prevent entry of water into the interior of the door. When the window is completely lowered, the weather strip is moved to a position overlying the slot or well in the door by means of a spring hinge construction, to serve the same purpose and also to serve as a cushion arm rest. The resilient weather strip also serves as a squeegee to clean the window glass. The present invention is directed generally to the same subject matter, but presents certain advantages over my prior applications.

One object of the present invention is to provide a more stable pivotal mounting for the weather strip and to form this mounting either as an integral part of the vehicle door or as a detachable mounting.

Another object of the invention is to provide a pivotal mounting for the weather strip that is continuous throughout substantially the entire length of the weather strip.

When engaging the window glass, the weather strip is inclined with respect to the glass and a space open at either end of the strip is provided between the strip and the glass. An object of the present invention is to provide means for preventing entry of moisture into the door, due to forward movement of the vehicle, through this space between the window and the weather strip.

Another object of the invention is to provide means whereby the pivotal mounting for the weather strip may be secured to the door in a plurality of alternate or cumulative manners.

A further object of the invention is to provide an intimate engagement between the weather strip and its mounting, to prevent ready disassociation of the strip, except in a particular manner.

A still further object of the invention is to provide a manner of attaching the strip to its mounting to prevent unauthorized disassociation of the strip.

Another object is to provide means for attaching the weather strip to its mounting to prevent disassociation of the strip, except in a particular manner, that is available only to an authorized user of the vehicle.

Other various advantages and objects of the invention will become apparent in the following detailed description of preferred embodiments of the invention, wherein reference is made to the accompanying drawing, in which:

Figure 1 is a fragmentary perspective view of the left hand side door of a vehicle having the weather strip of the present invention secured thereto;

Figure 2, an enlarged fragmentary cross-sectional view of a vehicle door, taken on the line 2—2 of Figure 1, with the vertically reciprocable window lowered and one embodiment of the present invention secured to the door;

Figure 3, a cross-sectional view similar to Figure 2, with the vertically reciprocable window partially raised, and a modified embodiment of the invention secured to the door and engaging the window;

Figure 4, a cross-sectional view similar to Figure 2, showing a further embodiment of the invention, in addition to the manner of affixing a wind guard to the door;

Figure 5, a cross-sectional side view of a hinge member providing a pivotal support for the weather strip;

Figure 6, a perspective view of a wind guard;

Figure 7, a fragmentary horizontal cross-section of the present invention taken on line 7—7 of Figure 2, with portions broken away to reveal the hinge construction; and Figure 8, a cross-sectional view similar to Figure 2 of a further embodiment of the invention, wherein the pivotal support of the weather strip is integral with the vehicle door.

In Figure 1, I have shown a door 10, which is the left hand front door, of a vehicle. At the forward edge of the door 10, a vent window 12 is pivoted on a vertical axis. Immediately to the rear of the window 12 is a window 14 which is vertically reciprocable in response to actuation by the driver of the vehicle through controls on the inner side of the door. The window 14 is mounted for reciprocation in a slot or window well 15 provided in the door (see Figures 2 and 3). The window 14 is supported at its bottom edge in a usual manner and is supported at one side in a groove in the door frame portion 16 extending between the windows 12 and 14, at its other side in a groove in the rear margin 18 of the door, and at its top in a groove in the top part of the door (not shown). Pivotally mounted on the door adjacent the window 14 is a weather stripping device generally indicated by the numeral 20.

The weather stripping device 20 generally comprises an elongate piece of resilient material 22, designated hereinafter as a weather strip, and a fastening means or pivotal support 24. The weather strip 22 is a unitary member including a relatively thick body portion 26 serving as a cushion or cushion rest for the arm of an occupant of the vehicle, a tail or overhanging edge portion 32 serving to shield the pivotal mounting of the strip 22, and a nose or squeegee edge portion 34 adapted for intimate engagement with the window glass 14. A recess 33 is provided in the body 26 of the strip between the body and the tail portion 32 to receive the hinge or pivotal mounting for the strip. If desired, the glass engaging edge or squeegee portion of the weather strip may be provided with a glass engaging material of a lesser coefficient of friction than rubber, such as felt, as shown in the earlier of my copending applications.

The preferred embodiment of the invention is shown in Figure 2, in which a longitudinally extending slot 28 is provided in the body portion 26 and communicates with a transverse slot 30 which extends substantially normal to the plane of the slot 28 from the bottom side or surface of the body 26. If desired, a plurality of small holes may be formed in the body 26 rather than the slot 30, for the purpose defined hereinafter. A metal reinforcing strip 36 is slidably received within the slot 28. If desired, the reinforcing strip 36 may be molded into the weather strip 22. The strip 36 extends continuously throughout substantially the full length of the weather strip 22 and is provided with a plurality of spaced tapped holes 38 which coincide with the transverse slot 30. If a plurality of holes are formed in the strip 22 rather than the slot 30, the strip 36 is so adjusted within the slot 28 as to align the tapped holes 38 with the holes in the strip 22. Adjacent the squeegee nose 34, the body 26 is provided with an inclined slot 37 and intermediate the slot 37 and the slot 30, the body 26 is provided with a slot 39 extending parallel to the slot 30. The purpose of the slots 37 and 39 will be explained hereinafter.

The pivotal support 24 for the strip 22 comprises a hinge, preferably of the piano type, including a first leaf or arm 40, a second angle shaped leaf or arm 42, and a pintle pin 44 pivotally connecting the two leaves. In the preferred embodiment of the present invention, the hinge is continuous throughout substantially the full length of the strip 22. Coil springs 45 are mounted on the pintle pin 44 in a usual manner to urge the two leaves 40 and 42 of the hinge toward one another. As shown in Figure 5, the hinge leaf or arm 40 is normally flat and is provided with screw holes 46. The leaf 40 intimately engages the lower surface of the strip 22 throughout a substantial portion of that surface, but does not extend so far toward the squeegee edge 34 of the strip as to rub against the window glass at any time. The other hinge arm or leaf 42 is of angle shape in cross section, having one portion normally disposed horizontally, and an end portion normally disposed vertically. The horizontal wall is adapted to engage with the top wall of the door adjacent the window 14, on what is commonly known as the sill 49 of the door. The vertically extending end portion of the leaf 42 normally is adapted to engage a side wall 51 of the window well 15. The arm or leaf 42 may be secured to the sill 49 or to the side wall 51 of the well by means of screws 52 extending through holes 48 in the horizontal portion or holes 50 in the vertical portion. If desired, both sets of holes may be utilized for securing the leaf 42 to the door 10. The securement to the wall 51 of the window well is usually resorted to when the weather stripping device is affixed to the door during the original assembly of the door, to be sold as original equipment on the vehicle. The securement to the sill 49 of the door is resorted to when the weather stripping device is affixed to the door after assembly thereof, as an accessory. The leaf 42 may take any desired shape to conform to the configuration of the car door so as to intimately engage the door.

Most vehicle doors are provided with a trim strip to which a felt or like member is secured for engagement with the window to prevent entry of water to the well. This strip has proven very ineffectual and the present invention is particularly adapted to replace the strip. The trim strip is normally secured to the wall of the window well. By removing the window frame on the interior of the door and lowering the window into the well, the strip is exposed and can be removed. The weather stripping device of the present invention can then be secured to the door, utilizing the same holes as were originally provided for the trim strip. This method of attaching my weather stripping device is highly advantageous.

The end portion 53 of the hinge leaf or arm 40 is bent upwardly so as to extend at an acute angle with respect to the main portion of the leaf and is received within the slot 37. The screw holes 46 in the leaf 40 are normally displaced with respect to the slot 30, but are adapted to be aligned with the holes or slot 30 in the strip 22 and with the screw holes 38 in the reinforcing strip 36 to compress or wedge a portion of the body 26 between the strip 36 and the end portion 53 of the leaf 40. The slot 39 accommodates this compression. Screws 54 are passed through the holes 46 in the leaf 40, through the slot 30 in the body portion 26 and into the tapped holes 38 in the reinforcing strip 36. When the screws 54 are tightened, the hinge leaf 42 flexes, as shown in Figure 2, and the wedge shaped portion of the strip 22 lying between the reinforcing strip 36 and the hinge leaf 40 is rigidly confined except for the resiliency of the material. Due to this wedging action, the strip 22 cannot be forcibly removed from the hinge leaf 40. Such construction prevents the removal or theft of the device by an unauthorized person, since the strip 22 can be removed from the hinge leaf 40 only by lowering the window 14 into the well 15 and removing the screws 54 from the interior of the door by raising the strip 22 to the position shown in Figure 3. The hinge leaf 42 may be originally curved, as shown in Figure 2, if desired.

In Figure 3, a modified embodiment of the invention is shown, parts or portions thereof similar or identical to parts or portions of the embodiment described hereinbefore being indicated by the same reference characters with the suffix "a." In the Figure 3 embodiment, I provide a longitudinally extending arcuate slot 28a in the body portion 26a, the slot extending into close proximity to the squeegee edge 34a. The slot 28a is so positioned and curved as to define between itself and the lower margin of the body 26a, a wedge portion of material. A transverse slot 30a is provided in the body portion 26a and extends substantially normal to the mean plane of the slot 28a from the bottom side or surface of the body 26 into communication with the slot 28a. If desired, a plurality of small holes may be formed in the body 26a rather than the slot, as described hereinbefore. A metal reinforcing or supporting strip 36a having a curvature corresponding to that of the slot 28a is slidably received within the slot. If desired, the reinforcing strip 36a may be molded into the weather strip 22a. The strip 36a extends into close proximity to the squeegee edge 34a of the strip 22a to provide support for that edge. The wedge portion of the body 26a, previously mentioned, is divided into two wedge shaped portions, indicated at 39a, defined by the lower surface of the reinforcing strip 36a, the transverse holes or slot 30a and the lower marginal edge or surface of the strip 22a. The wedge shaped portions 39a serve the same purpose as does the wedge shaped portion of the embodiment of the invention first described.

The free end portion of the hinge leaf 40a may be upturned as at 53a so as to initimately engage in a specially formed vertical recess 37a in the body portion 26a, but in this embodiment of the invention, need not be so formed.

In Figure 2, I have shown the lower hinge leaf 42 as being secured to the door by means of screws extending through the holes 50a in the vertically extending portion of the leaf for securement to the side wall 51 of the window well 15. In Figure 3, an identical hinge construction is shown, but the lower leaf 42a is secured to the sill 49 of the door 10 by means of screws extending through the holes 48a in the horizontal portion of the hinge leaf 42a. As previously stated, the affixation of the weather stripping device to the door as shown in Figure 2, is utilized when the weather stripping device is installed as original equipment on a new car. The affixation method shown in Figure 3 is utilized when the weather stripping device is secured to the door after assembly thereof, as an accessory for the vehicle. In either type of mounting, the screws are inaccessible unless the window is lowered and the weather strip is elevated as shown in Figure 3, to expose the screws for removal, solely from the inside of the door. Due to such construction it is impossible for an unauthorized person to remove the weather stripping device from the door. This prevents tampering with the door, the window, or the weather stripping device itself.

In Figure 4, a further embodiment of the invention is shown in which the weather strip is formed in a slightly different configuration. In particular, the strip is not provided with the pointed squeegee edge, but is provided with a rounded edge which serves the same purpose as the pointed squeegee edge, but perhaps not to the same efficient degree. The Figure 4 embodiment of the invention utilizes the hinge construction of Figure 3, but includes a different type of reinforcing element which provides a different type of wedging action. Parts or portions of the Figure 4 embodiment of the invention, similar or identical to parts or portions of the previously described embodiments, are indicated by the same reference numerals with the suffix "b." The reinforcing strip 36b is substantially rectangular in cross-section and is provided with threaded bores or holes 38b. Screws 54b extend through the upper leaf 40b, through a slot or hole 30b in the body 26b and are received within the tapped holes 38b in the reinforcing strip 36b. The distance between the upturned end 53b of the hinge leaf 40b and the holes 46b therein is somewhat less than the normal distance between the vertical recess 37b in the body portion 26b and the threaded holes in the reinforcing strip 36b. When the hinge leaf 40b and the strip 22b are assembled, the material of the strip is compressed between the upturned end 53b of the hinge leaf 40b and the screw 54b, the compressed or wedged portion being indicated at 39b. This compression serves substantially the same purpose as does the wedging action previously explained with regard to the embodiments of Figures 2 and 3.

A feature of the present invention is the provision of a guard plate to conform substantially to the space between the window and the weather stripping device when the window is elevated, as shown in Figure 3, to block off the space. This prevents entry of wind to the space due to forward travel of the vehicle to overcome any possibility of destruction or damage to the device and to prevent entry of moisture to the door through the space. A preferred wind guard 60 is shown in perspective in Figure 6. The guard 60 comprises a vertically extending plate 62, generally triangular in side elevation, and having a transversely disposed angle member 64 extending to one side thereof. The angle member 64 is provided in each of its legs with a hole 66, the holes being disposed in the same relation as are the holes 48 and 50 in the angle shaped hinge leaf 42. The wind guard 60 is particularly designed for use at the forward edge of the window 14 to prevent the entry of wind and moisture during forward movement of the vehicle, but it may be used at either or both ends of the weather stripping device, if the vehicle door is provided with a squared window framing. Where the window frame is provided with a curved corner at the rear end of the window, the resilient weather strip extends beyond the hinge therefor and intimately engages the window framing to prevent entry of moisture. The thickness of the resilient strip may be descreased and the free end may be provided with any desired configuration to insure an intimate engagement. The wind guard 60 is preferably spot welded to the angle hinge leaf 42, but may be affixed to the door as shown in Figure 4, wherein the angle member 64 is positioned to engage the sill 49 and the wall 51 of the window well beneath the angle shaped leaf 42. The screws 52 for affixing the leaf 42 to the door, extend through the holes 66 in the angle member 64 and simultaneously secure the hinge leaf and the wind guard 60 to the door 10. The wind guard 60 effectively blocks off the space between the window 14 and the weather stripping device 20, as is clearly shown in Figure 3.

In Figures 5 and 7, the hinge construction is clearly shown as consisting of the leaves 40 and 42 pivotally connected by the pintle pin 44. The hinge is formed in the usual manner by providing serrated edge portions 70 and 72, respectively, on the hinge leaves, having alternately extending portions to be wrapped around the pin 44. Certain of the extending portions are cut away as at 74 to provide space for the reception of a plurality of coil springs 45. One end 78 of each spring 45 is bent over and engages the upper surface of the hinge leaf 40 and the other end 80 of each spring engages the marginal wall of the lower hinge leaf 42, as is clearly shown in Figure 5. The springs 45 serve to constantly urge the hinge leaves toward one another to effect a resilient engagement between the window glass and the squeegee edge of the wiper strip 22 when the window is elevated and to move the strip 22 over the window well 15 when the window is lowered into the well. Due to this resiliently urged construction, the weather strip 22 serves not only as a squeegee unit, but also as an anti-rattle device for the window 14.

Several ways of manufacturing and selling the device suggest themselves, among which are the following: The weather strip 22 may be molded or extruded in extremely long lengths separately of the reinforcing strip 36. After formation, the strips 22 could be cut to proper lengths and a reinforcing strip 36 of slightly shorter length could be cut to be slipped within the slot 28 in the body portion 26 of the strip 22. The hinge or pivotal support 24 could also be formed in elongate lengths and cut to fit a particular installation, the assembly of the weather strip 22, the reinforcing strip 36 and the hinge 24 being effected at the time the sale is made, and the weather stripping device is being affixed to the vehicle. If this were the method of manufacture, the retailer or supplier could purchase a roll or a length of resilient weather strip 22, a separate roll or elongate length of reinforcing strip 36 and either an elongate length of hinge 24 or a plurality of various lengths of hinge. He would then cut the various members of the device into the proper lengths at the time of each individual sale. The weather stripping device may also be completely assembled by the manufacturer prior to being forwarded to the retailer or supplier. If this method of manufacture were followed, the manufacturer could assemble and supply a device consisting of a hinge slightly shorter than the shortest window to which the device is to be applied, a reinforcing strip of substantially the same length, and a weather strip of a length in excess of that of the hinge and reinforcing strip, which length would satisfy the requirements of the longest window to which the device is to be applied. When applied to windows shorter than said longest window, the ends of the weather strip would be cut off to the proper size. A third method of manufacture also suggests itself, namely, that the manufacturer assemble and supply particular models of the device adapted for each and every size window currently known to exist in vehicles.

An alternate form of the invention is shown in Figure 8, in which the weather stripping device is formed integrally with the door of the vehicle, as a part of the original equipment supplied by the vehicle manufacturer. In such construction, the door 10 is provided with a sill portion and well portion 15 consisting of a metallic wall slit at evenly spaced points to provide portions 82 that are folded up around the pintle pin of a hinge. The alternate portions 84 of the wall are formed as an interrupted window well wall 51c. The portions 82 serve as a support for a pintle pin 44c. A hinge leaf 40c is secured to the pintle pin for pivotal movement in the usual manner, springs being provided to urge the hinge leaf 40c toward the sill 49c of the door 10c. In all other features, the weather stripping device would be the same as that previously described, any of the embodiments of the invention being utilized. Several possible constructions for an integral formation of the weather stripping device present themselves. The portions 82 of the door could be bent in the opposite direction to engage a pintle pin extending below the upper surface of the sill 49c so as to provide a construction in which the weather stripping device would be substantially flush with the surface of the sill 49c. In addition, the pintle pin engaging portions of the weather stripping device itself, could be integral rubber pieces having a perforation through which the pintle pin extends. In any of the various forms, the tail portion 32 of the strip 22 could advantageously be omitted.

In the formation of the weather strip 22, it is preferred that the squeegee edge 34 be made of relatively thin section so as to be readily flexible to follow any variations in the surface configuration of the window 14. In this respect, it is particularly advantageous to have a flexible squeegee edge 34 for use with vehicles provided with reinforcing flanges encircling the edges of the window 14. These constructions are prevalent in the type of vehicle known as "convertibles" and also in taxicabs and trucks. In such constructions, the squeegee edge 34 would readily flex to conform to variations in the surface contour caused by the window reinforcing flanges. In addition, the free flexing of the edge 34 is enhanced by a pivotal action provided by the slot 37.

In all embodiments of the invention utilizing a hinge leaf 40 having a turned end portion 53, it is advantageous to provide a slot, such as 39 in Figure 2, to facilitate the compressive or wedging action described, since for best operation, the material of the weather strip is relatively hard and incompressible.

It will be understood that the foregoing embodiments of the invention have been described as preferred embodiments, yet only exemplary of the invention defined by the appended claims. Variations in the structural details and the materials may be utilized without departing from the spirit and scope of the present invention. Therefore, I do not intend to be limited to the exact details of the preferred embodiments of the invention illustrated, except insofar as the appended claims are so limited, since various modifications and changes coming within the scope of my invention will be suggested to others by this disclosure.

I claim:

1. A weather stripping device for vehicle door windows comprising a resilient weather strip adapted to intimately engage a window, means pivotally supporting said strip on the door adjacent the window, and a guard secured to the door adjacent the forward edge of said weather strip, said guard extending across the space between the weather strip and the window when the latter is in its raised position to prevent entry of wind and moisture to the space between said weather strip and the window as would normally be induced by movement of the vehicle.

2. A weather stripping device for vehicle door windows comprising a resilient weather strip adapted to intimately engage a window, and a hinge adapted to pivotally support said strip on the door adjacent the window, the hinge being disposed within the marginal confines of said strip and including a pair of leaves adapted to be connected respectively to the door and said strip, means operatively associated with said strip and the leaf connected to said strip to lock said strip to said leaf, the leaf for connection with the door comprising an angle member adapted to engage the top surface of the door adjacent the window and the inner surface of the window well in the door, and means for securing said angle member leaf to the door on either surface, whereby said hinge is concealed from sight by said strip, unauthorized removal of said strip from said hinge is prevented, and unauthorized removal of the device from the door is prevented.

3. A weather stripping device for vehicle door windows comprising a resilient weather strip adapted to intimately engage the window, and hinge means adapted to pivotally support said strip on the door adjacent the window, said means including a leaf comprising an angle member having one leg engaging an exterior surface of said strip and connected to said strip and having its other leg embedded in said strip, the distance between the point of connection of said one leg to said strip and said other leg being less than the normal distance between corresponding portions of said strip, whereby portions of said strip are wedgedly confined between said legs.

4. A weather stripping device for a vehicle door window comprising a resilient weather strip adapted to intimately engage the window and being of a length substantially equal to that of the window, means for pivotally supporting said strip on the door adjacent the window, and a reinforcing strip embedded in said weather strip substantially throughout the length thereof, said means including a hinge leaf extending along one surface of said weather strip and connected to said reinforcing strip, said reinforcing strip being so shaped and positioned with respect to said hinge leaf as to define a wedge shaped area of the resilient material of the weather strip therebetween, a portion of said weather strip confined between said leaf and said reinforcing strip serving to prevent removal of said weather strip after said hinge leaf has been connected to said reinforcing strip.

5. A new article of manufacture for use in conjunction with an automobile door window comprising a weather strip of a length adapted to correspond to the length of the window slot in the automobile door and of a width greater than the slot, means for pivotally connecting said weather strip with the automobile door structure for hinge like movement from a raised position wherein it bears against the window glass when the latter is raised to a position over the window slot when the window glass is lowered through the slot, and a guard positioned adjacent at least the forward end of said weather strip, said guard extending across the space between the weather strip and the window when the latter is in its raised position to prevent entry of moisture between said strip and the window when said strip is in its raised position.

6. A new article of manufacture for use in conjunction with an automobile door window, comprising a weather strip of a length adapted to correspond to the length of the window slot in the automobile door and of a width greater than the slot, fastening means for connecting said weather strip with the automobile door structure, said weather strip being secured to said fastening means for hinge like movement from a raised position, wherein it bears against the window glass when the latter is raised to a position over the window slot when the window glass is lowered through the slot, and a reinforcing strip extending longitudinally of said weather strip and embedded therein, said reinforcing strip being so positioned with respect to said weather strip and said fastening means as to define a wedge shaped portion of the material of the strip between said fastening means and said reinforcing strip to prevent unauthorized removal of said weather strip.

7. A weather stripping device for windows of the type that are raised to a closed position and lowered into a well to an open position, comprising a resilient weather strip of a length substantially equal to that of the window and of a width in excess of the well, means pivotally mounting said strip adjacent the window and for urging the strip toward the window, said strip assuming a raised position engaging the window when the window is raised to provide a seal between itself and the window and a lowered position when the window is lowered into the well to cover the well and prevent entry of extraneous matter to the well, and a reinforcing strip extending longitudinally of said weather strip and embedded therein, said reinforcing strip being so positioned with respect to said weather strip and said mounting means as to define a wedge shaped portion of the material of the strip between said means and said reinforcing strip to prevent unauthorized removal of said weather strip.

8. A weather stripping device for windows of the type that are raised to closed position and lowered to an open position, comprising a resilient weather strip of a length substantially equal to that of the window and of a width in excess of that of the well, means pivotally mounting said weather strip adjacent the window and for urging said weather strip toward the window, whereby said weather strip assumes a raised position engaging the window when the window is raised to provide a seal between itself and the window, and a lowered position when the window is lowered into the well to cover the well and prevent entry of extraneous matter to the well, and a reinforcing strip embedded in said weather strip, said means including an arm having a portion engaging an exterior surface of said weather strip, and fastening means connecting said reinforcing strip and said arm, said reinforcing strip and said arm being so disposed with respect to one another to confine a portion of the material of said weather strip therebetween to provide a wedging action preventing unauthorized disassociation of said weather strip from said means.

9. A weather stripping device for windows of the type that are raised to a closed position and lowered to an open position, comprising a resilient weather strip of a length substantially equal to that of the window and of a width in excess of that of the well, means pivotally mounting said weather strip adjacent the window and for urging said weather strip toward the window, whereby said weather strip assumes a raised position engaging the window when the window is raised to provide a seal between itself and the window, and a lowered position when the window is lowered into the well to cover the well and prevent entry of extraneous matter to the well, and a reinforcing strip embedded in said weather strip, said means including an arm having a portion engaging an exterior surface of said weather strip, and fastening means connecting said reinforcing strip and said arm, said arm having a turned end portion embedded in said weather strip, said reinforcing strip and said turned end portion confining a portion of the material of said weather strip therebetween, whereby a wedging action is provided to prevent unauthorized removal of said weather strip from said arm.

10. A weather stripping device according to claim 9, in which said weather strip is provided with a slot extending longitudinally of said weather strip between said reinforcing strip and said turned end portion of said arm to accommodate the wedging action.

11. A weather stripping device for vehicle windows comprising a resilient weather strip of a length substantially equal to that of the window, and means pivotally mounting said strip adjacent the window, said means including an arm adapted to be secured to said strip, said arm having a turned end portion embedded in said strip, a portion of the material of said strip being confined between said turned end portion and the point of securement of said arm to said strip, said strip being provided with a longitudinal slot between said turned end portion and the point of securement of said arm to said strip to accommodate the confinement of said portion of said strip.

12. A weather stripping device for a vehicle door window comprising a resilient weather strip adapted to intimately engage the window and being of a length substantially equal to that of the window, means for pivotally supporting said weather strip on the door adjacent the window, and a reinforcing strip embedded in said weather strip substantially throughout the full length thereof, said means including an arm connected to said reinforcing strip, said reinforcing strip and said arm being so disposed with respect to one another as to confine a portion of the material of said weather strip therebetween to provide a wedging action preventing unauthorized disassociation of said weather strip from said means.

13. A weather stripping device for a vehicle door window comprising a resilient weather strip adapted to intimately engage the window and being of a length substantially equal to that of the window, a reinforcing strip embedded in said weather strip substantially throughout the full length thereof, and an arm connected to said reinforcing strip, said arm being pivotally connected to integral portions of the vehicle door for supporting said weather strip on the door adjacent the window, said reinforcing strip and said arm being so disposed with respect to one another as to confine a portion of the material of said weather strip therebetween to provide a wedging action preventing unauthorized disassociation of said weather strip from said arm.

References Cited in the file of this patent

UNITED STATES PATENTS

| Number | Name | Date |
| --- | --- | --- |
| 991,140 | Davis | May 2, 1911 |
| 1,393,192 | Baker | Oct. 11, 1921 |
| 1,522,183 | Haarnagell | Jan. 6, 1925 |
| 1,962,508 | Josselyn | June 12, 1934 |
| 2,206,334 | Rosner | July 2, 1940 |
| 2,274,026 | Allen | Feb. 24, 1942 |
| 2,519,446 | Elsebusch | Aug. 22, 1950 |
| 2,550,619 | Sutherland | Apr. 29, 1951 |
| 2,563,252 | Larsen | Aug. 7, 1951 |